Patented Nov. 14, 1939

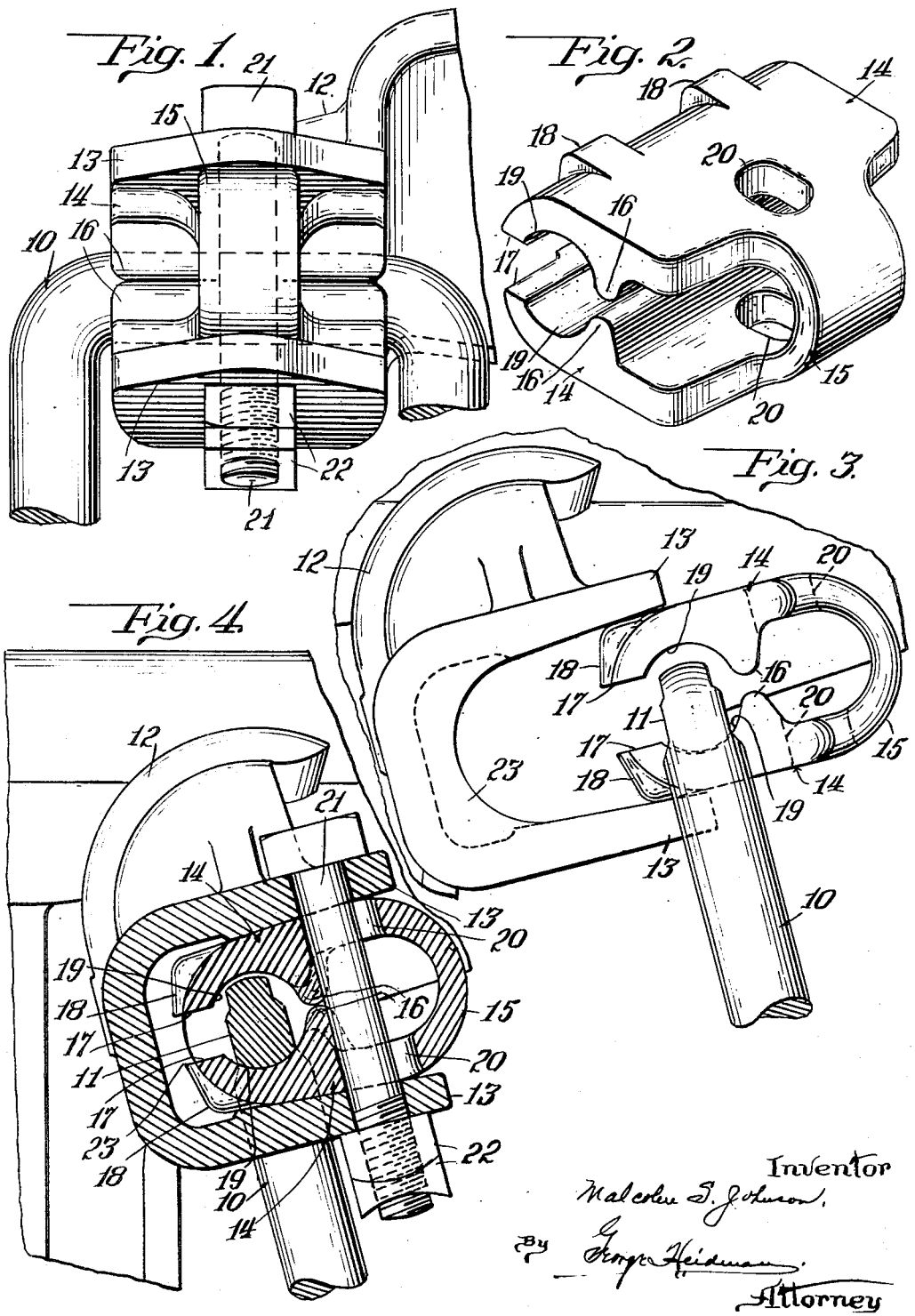

2,179,722

UNITED STATES PATENT OFFICE 2,179,722

BRAKE HANGER RETAINER

Malcolm S. Johnson, Chicago, Ill., assignor to Illinois Railway Equipment Company, Chicago, Ill., a corporation of Illinois Application June 11, 1938, Serial No. 213,182

7 Claims. (Cl. 188—209)

My invention relates to means whereby the usual brake hangers of railroad cars, and more particularly the brake hangers of railroad freight cars, are not only properly supported and retained in the sockets of the brackets secured to the truck frames, but the brackets, which are usually integral with the truck frames, relieved of the wear resulting from the more or less constant vibration and swinging movement of the brake hangers or links which are pendently supported in place.

As the brackets are cast integral with the truck frame, which are of cast metal, the sockets in the brackets soon become worn by the vibratory action of the hangers or links which are of harder metal, allowing the hanger and suspended brake heads to drop down beneath the normal point for proper brake application and as required in railroad operation.

My invention relates to a one piece hanger supporting and retaining element which may be reversed in the socket of the truck frame bracket in the event of wear of the lower or hanger supporting leg or side of the retainer which is preferably made of resilient steel and adapted to be forced or sprung into the bracket socket so as to effect a firm, binding relation with the walls of the socket.

My improved single piece hanger retaining element is provided with a hanger introducing opening extending lengthwise of the inner longitudinal side and is also provided with stop means adjacent the hanger receiving channel therein to limit the approaching movement of the two sides of the retainer element and hence prevent a binding relation between the retainer element and the hanger.

My improved hanger retaining element is also designed to prevent contact between the hanger and the fastening means or pin which secures the retainer in the bracket socket and hence obviates wear of the fastening pin or means; the retainer involving means whereby interengaging relation with the walls of the bracket socket will be provided to prevent any transverse movement thereof.

The object of the invention and its advantages will be comprehended from the detailed description of the accompanying drawing wherein:

Figure 1 is an end elevation of the socketed truck frame bracket as viewed from the front or open side of the bracket which is provided with my improved retainer and illustrating the upper end of a brake hanger.

Figure 2 is a perspective view of my improved retainer.

Figure 3 is a side elevation of the socketed bracket and of my improved retainer with applied hanger, illustrating the manner of inserting the retainer and its normal condition.

Figure 4 is a sectional elevation of the same, illustrating the retainer completely driven or sprung into place.

The particular exemplification of my invention is especially adapted for use in connection with the continuous or closed link type of hanger, the upper portion or end whereof is shown at 10; the hanger being of present day standard construction with flat sided ends as shown at 11.

The bracket arm 12 is usually integral with the truck frame and its outer free end disposed in the general direction of the wheels of the truck and provided with vertically spaced apart jaws or walls 13, 13 united at the rear to provide an upwardly slanting socket open at the front and sides to permit insertion of the retainer and enable the hanger 10 to depend from the socket on opposite sides of the lower jaw or wall 13.

My improved retainer consists of a single piece member formed to provide two similar upper and lower wall portions 14, 14, of length substantially equal to the transverse dimensions of the socket in the bracket. The two wall portions 14, 14 are normally spaced apart and are united with each other at one longitudinal side by means of the arcuate wall portion 15, which is preferably of less dimensions, transversely, than the length of the main wall portions 14, 14, as shown in Figure 2.

The opposing faces of the wall portions 14, 14 are each provided with a rib 16, preferably extending lengthwise of the portions 14, 14 and arranged a predetermined distance removed from the free longitudinal sides 17; the ribs 16, 16 being arranged in opposing relation to act as stops against compressing the two sides or walls 14, 14 into binding relation with the hanger 10 and thereby prevent free swinging movement of the link or hanger 10.

The free longitudinal sides 17 of wall portions 14, 14 are preferably made to curve toward each other as shown and the outer surfaces of the portions 14, 14, adjacent the free sides, are each shown provided with shoulders or angular lugs 18, which practically constitute continuations of the substantially flat outer surfaces of the portions 14.

The inner surfaces of both portions 14, intermediate of the curved free sides 17 and the ribs 16, are each provided with a dished surface or groove 19 adapted to receive the upper end of the brake hanger or link 10 and allow free swinging movement of the latter; the combined channel formed by both grooves 19 being of greater dimensions than the transverse dimension of the upper end of the hanger or link 10.

The two portions 14, preferably at points coincident with the arcuate connecting wall 15, are provided with registering holes 20, 20 which are adapted to register with similar holes in the top and lower jaws or walls 13, 13 of the bracket when the retainer with the inserted hanger 10 is driven completely into the socket of the bracket 12, in order to permit insertion of the locking element or bolt 21, with the lower threaded end provided with a nut and lock washer as at 22.

The retainer, as previously stated, is preferably made of resilient steel with the free longitudinal sides of the two similar sides 14, 14 spread sufficiently apart to permit the flattened end of the hanger 10 to be readily inserted through the opening and into the channel formed by the correlated grooves 19; and for the sake of lightness and easier flexing I prefer to make the arcuate connecting wall 15 of less width than the main portions of the retainer.

After the upper end of the brake hanger 10 has been inserted into place, as shown in Figure 3, the open sided part of the retainer is then inserted through the front open end of the socket in the truck frame bracket 12. As the vertical dimensions of the open side of the retainer in its normal condition is slightly greater than the vertical dimensions of the socket of the bracket, the retainer is driven into the socket until it is completely in place as shown in Figure 4. Due to the resilience of the retainer the open side thereof will be compressed sufficiently to prevent displacement of the hanger, as shown in Figure 4; the degree of compression being controlled by the opposing lips or ribs 16, 16 as disclosed in Figure 4, where the retainer is completely in place, at which time the shoulders 18 will be disposed in the rear recessed end of the bracket socket and hence rearward of the forward faces of the end walls 23, see Figures 3 and 4 and thereby hold the retainer against longitudinal movement.

The opposingly disposed free longitudinal sides of the main walls 14 and the lips or ribs 16 are spaced apart to define the hangar receiving channel and also permit free swinging movement of the hanger; the stops or ribs 16 preventing any binding relation between the retainer and the hanger.

It is apparent from the construction that in the event of wear on the hanger supporting side of the retainer, the latter may be withdrawn from the bracket socket, the two sides 14, 14, slightly sprung apart to permit the retainer to be slipped off the end of the hanger 10 and the retainer reversed by placing the worn side at the top and thus placing the unworn side in hanger supporting position; the retainer with the re-inserted hanger then again driven into place.

The exemplification of my invention preferably consists of a single piece reversible forging which is best adapted for the purposes intended, but the invention may have other embodiments without, however, departing from the spirit of my invention as defined in the appended claims.

What I claim is:

1. A brake hanger retainer comprising a single piece resilient element composed of two substantially parallel corresponding main portions united at one longitudinal side by an arcuate wall, while the free longitudinal edges curve toward each other, the opposing surfaces of said main portions being dished to provide hanger receiving grooves and having opposing surfaces adapted to limit the degree of movement of said main portions toward each other.

2. A brake hanger retainer comprising a single piece element composed of two corresponding vertically spaced main portions united by a resilient connecting wall, while the free longitudinal edges of said main portions are disposed toward each other, the inner faces of said main portions being formed to provide a hanger receiving surface, and means whereby the degree of movement of the two main portions toward each other is controlled.

3. A brake hanger retainer comprising a single piece member composed of two vertically spaced main portions united at one side by a resilient connecting wall of width less than the length of the main portions, the free longitudinal sides of said portions being disposed toward each other in spaced relation to provide a hanger inserting opening, while the inner faces of said main portions are grooved to provide a hanger receiving channel and are provided with opposingly disposed projections to limit the movement of said main portions toward each other.

4. A brake hanger retainer comprising a single piece member composed of two vertically spaced main portions united at one side by a resilient connecting wall, the unattached sides of said portions being disposed toward each other in spaced relation to provide a hanger inserting opening, while the interior of said retainer at a predetermined distance from said unattached sides is formed to limit the degree of movement of the main portions toward each other.

5. A brake hanger retainer comprising a single piece member composed of two vertically spaced main portions united at one longitudinal side by a resilient arcuate wall, the unattached longitudinal sides of said portions being curved toward each other and in spaced relation to provide a hanger inserting opening, the inner faces of said main portions at a predetermined distance from the unattached sides being provided with opposingly disposed ribs to limit the degree of movement of the main portions toward each other and to provide a hanger receiving channel intermediate of the ribs and said unattached sides, the retainer being provided with vertically aligned bolt receiving holes.

6. A reversible brake hanger retainer adapted to be inserted into the socket of a brake hanger bracket and comprising a single piece member composed of two vertically spaced main portions united at one longitudinal side by a resilient wall, the unattached longitudinal sides of said portions being disposed toward each other and in spaced relation to provide a hanger inserting opening, the outer surface of the retainer adjacent said longitudinal side being formed to effect interengaging relation with the walls of the bracket socket, the inner faces of the main portions at a distance removed from said free longitudinal edges being provided with opposing ribs whereby a hanger receiving channel between the free edges and said ribs is provided and the degree of movement of said main portions toward each other is determined, the retainer adjacent its other longitudinal side being provided with locking pin receiving openings.

7. A brake hanger retainer comprising a reversible single piece member composed of two correspondingly similar vertically spaced plate like main portions united at the outer longitudinal side by an arcuate narrow resilient portion, while the inner longitudinal sides of said main portions curve toward each other and are normally spaced apart to permit introduction of a hanger, the inner opposing faces of said main portions being provided with opposingly disposed ribs extending lengthwise of said portions adapted to limit movement of said main portions toward each other and prevent binding relation with the hanger, a hanger receiving groove in each main portion between said curved longitudinal sides and said ribs, said main portions intermediate of said ribs and said narrow resilient portion having vertically aligned bolt receiving holes.

MALCOLM S. JOHNSON.